(12) United States Patent
Sundaresan et al.

(10) Patent No.: US 7,870,258 B2
(45) Date of Patent: Jan. 11, 2011

(54) SEAMLESS FAIL-OVER SUPPORT FOR VIRTUAL INTERFACE ARCHITECTURE (VIA) OR THE LIKE

(75) Inventors: Sharad K. Sundaresan, Sammamish, WA (US); Balasubramanian Sriram, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 846 days.

(21) Appl. No.: 09/924,731

(22) Filed: Aug. 8, 2001

(65) Prior Publication Data

US 2003/0033412 A1 Feb. 13, 2003

(51) Int. Cl.
G06F 15/16 (2006.01)
G06F 11/00 (2006.01)

(52) U.S. Cl. .......................... 709/227; 714/2; 714/25; 714/43

(58) Field of Classification Search .................. 709/203, 709/227, 228, 245, 232; 714/4, 2, 25, 43
See application file for complete search history.

(56) References Cited

U.S. PATENT DOCUMENTS

| | | | | |
|---|---|---|---|---|
| 5,774,660 A * | 6/1998 | Brendel et al. | ............... | 709/201 |
| 5,925,103 A * | 7/1999 | Magallanes et al. | ......... | 709/230 |
| 6,154,765 A * | 11/2000 | Hart | ............ | 709/201 |
| 6,170,013 B1 * | 1/2001 | Murata | ........ | 709/229 |
| 6,243,105 B1 * | 6/2001 | Hoyer et al. | ................ | 345/440 |
| 6,470,389 B1 * | 10/2002 | Chung et al. | ................ | 709/227 |
| 6,480,941 B1 * | 11/2002 | Franke et al. | ............... | 711/153 |
| 6,490,610 B1 * | 12/2002 | Rizvi et al. | ................. | 718/101 |
| 6,715,099 B1 * | 3/2004 | Smith | ............... | 714/4 |
| 6,748,448 B1 * | 6/2004 | Barrera et al. | .............. | 709/245 |
| 6,801,949 B1 * | 10/2004 | Bruck et al. | ................ | 709/232 |
| 6,816,980 B1 * | 11/2004 | Fukuhara et al. | ............... | 714/4 |
| 6,883,099 B2 * | 4/2005 | Terrell et al. | .................. | 726/15 |
| 7,089,281 B1 * | 8/2006 | Kazemi et al. | ............. | 709/203 |

OTHER PUBLICATIONS

Don Cameron, The Virtual Interface Architecture, 1998, Intel.*
Dave Dunning, The Virtual Interface Architecture, 1998, IEEE.*
Barber, M.R. "Increased server availability and flexibility through failover capability", *Proceedings of the Eleventh Systems Administration Conference*, Oct. 1997, 89-97.

(Continued)

*Primary Examiner*—Tonia L Dollinger
*Assistant Examiner*—Asghar Bilgrami
(74) *Attorney, Agent, or Firm*—Woodcock Washburn LLP (57) ABSTRACT

To connect a client application to a server 'server' on a cluster 'cluster' having a plurality of servers instantiated thereon, 'cluster' and 'server' are received from the client application, a first request message is sent to 'cluster' requesting first connection information for connecting to 'server', a first reply message containing the requested first connection information is received from 'cluster', and the client application is connected to 'server' on 'cluster' based on the received first connection information. Thereafter, the connection to 'server' fails, and a second request message is sent to 'cluster' requesting second connection information for connecting to 'server', a second reply message containing the requested second connection information is received from 'cluster', and the client application is again connected to 'server' on 'cluster' based on the received second connection information.

16 Claims, 4 Drawing Sheets

OTHER PUBLICATIONS

Hagen, C. et al., "Highly available process support systems: implementing backup mechanisms", *Proceedings of the 18th IEEE Symposium on Reliable Distributed Systems*, Oct. 1999, 112-121.

Snoeren, A.C. et al., "Fine-grained failover using connection migration", *Proceedings of 3rd USENIX Symposium on Internet Technologies and Systems*, Mar. 2001, 221-232.

* cited by examiner

SEAMLESS FAIL-OVER SUPPORT FOR VIRTUAL INTERFACE ARCHITECTURE (VIA) OR THE LIKE

TECHNICAL FIELD

The present invention relates to a mechanism for providing fail-over support in a Virtual Interface Architecture (VIA) or the like. More particularly, the present invention relates to such a mechanism for use by a client in connection with a System Area Network (SAN) or the like implemented according to the VIA, where the operating system of the SAN does not itself provide fail-over support to re-direct a request from the client from a failed server to a working server taking the place of the failed server.

BACKGROUND OF THE INVENTION

A server is typically a software construct instantiated on a machine for the purpose of facilitating access to server data by a client. The server may be a single server operating on a physical machine, one of a plurality of servers operating on a physical machine, or one of a plurality of servers operating on a plurality of physical machines organized into a cluster, among other things. The client may be an application on a machine that is remote from or local to the machine/cluster of the accessed server, is typically connected to the machine/cluster of the server by a network such as the Internet and/or an Intranet, and addresses the server by way of one or more protocols such as TCP, LDAP, VIA, HTTP, or the like.

Typically, the client application employs server software to implement communication with and accessing data from a server at a machine/cluster. One example of such server software is SQL SERVER 2000 as developed and marketed by MICROSOFT Corporation of Redmond, Wash., USA, which is primarily employed to store and retrieve relational data by way of SQL (structured query language) commands. Generally, the client identifies the server by a name of the cluster/server upon which the server resides, the server software connects the client to the server based on the identified name, and the client thus can send a server request to the server based on the server name and receive appropriate information and/or data in response thereto.

Server availability in a clustered system is oftentimes increased by allowing the clustered system to automatically switch processing for an instance of a server from a failed server to a working server. Thus, the working server takes the place of the failed server and restores database services to a client formerly accessing data from the failed server. A set of clients and clustered servers interconnected by a System Area Network (SAN) is an example of a clustered system that automatically switches processing from a failed server to a working server. A SAN is typically operated at high speed and is employed in situations where such high speed is required, such as in back-office-type scenarios. Such SAN may be accessed by a client by way of protocols built according to a high-speed architecture such as the Virtual Interface Architecture (VIA). However, the operating system at the SAN of the SAN does not provide any support to enable VIA connectivity to clustered servers thereon, and does not provide any fail-over support to re-direct a request from the client from the failed server to the working server.

Accordingly, a need exists for a fail-over mechanism for a client of an SAN or the like to allow the client to discover the working server when the failed server fails. In particular, a need exists for such a fail-over mechanism implemented according to VIA.

SUMMARY OF THE INVENTION

The aforementioned need is satisfied by the present invention in which a client application is connected to a server 'server' on a cluster 'cluster' having a plurality of servers instantiated thereon. In the invention, 'cluster' and 'server' are received from the client application, a first request message is sent to 'cluster' requesting first connection information for connecting to 'server', a first reply message containing the requested first connection information is received from 'cluster', and the client application is connected to 'server' on 'cluster' based on the received first connection information. Once connected, the client application and 'server' may transact business.

Thereafter, it is determined that the connection to 'server' has failed. Presumably, 'server' has been moved from a first server of the cluster to a second server of the cluster. As should be appreciated then, the received first connection information corresponds to the first server.

Upon such determination, a second request message is sent to 'cluster' requesting second connection information for connecting to 'server', where the requested second connection information corresponds to the second server. A second reply message containing the requested second connection information is received from 'cluster', and the client application is connected to 'server' on 'cluster' based on the received second connection information. Once again connected, the client application and 'server' may again transact business.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
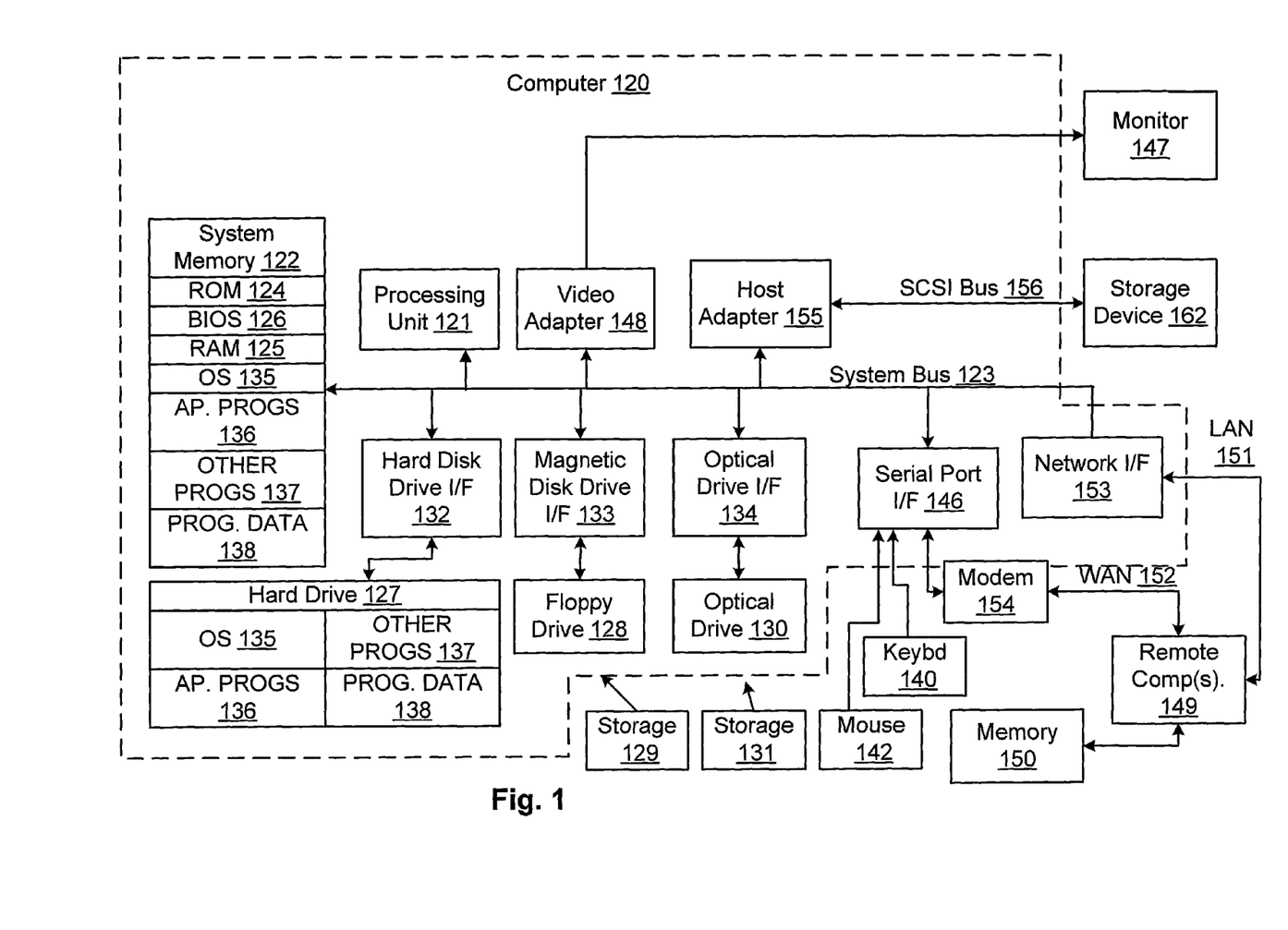
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

As mentioned, a computer 120 such as described above can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage.

Figure 4:
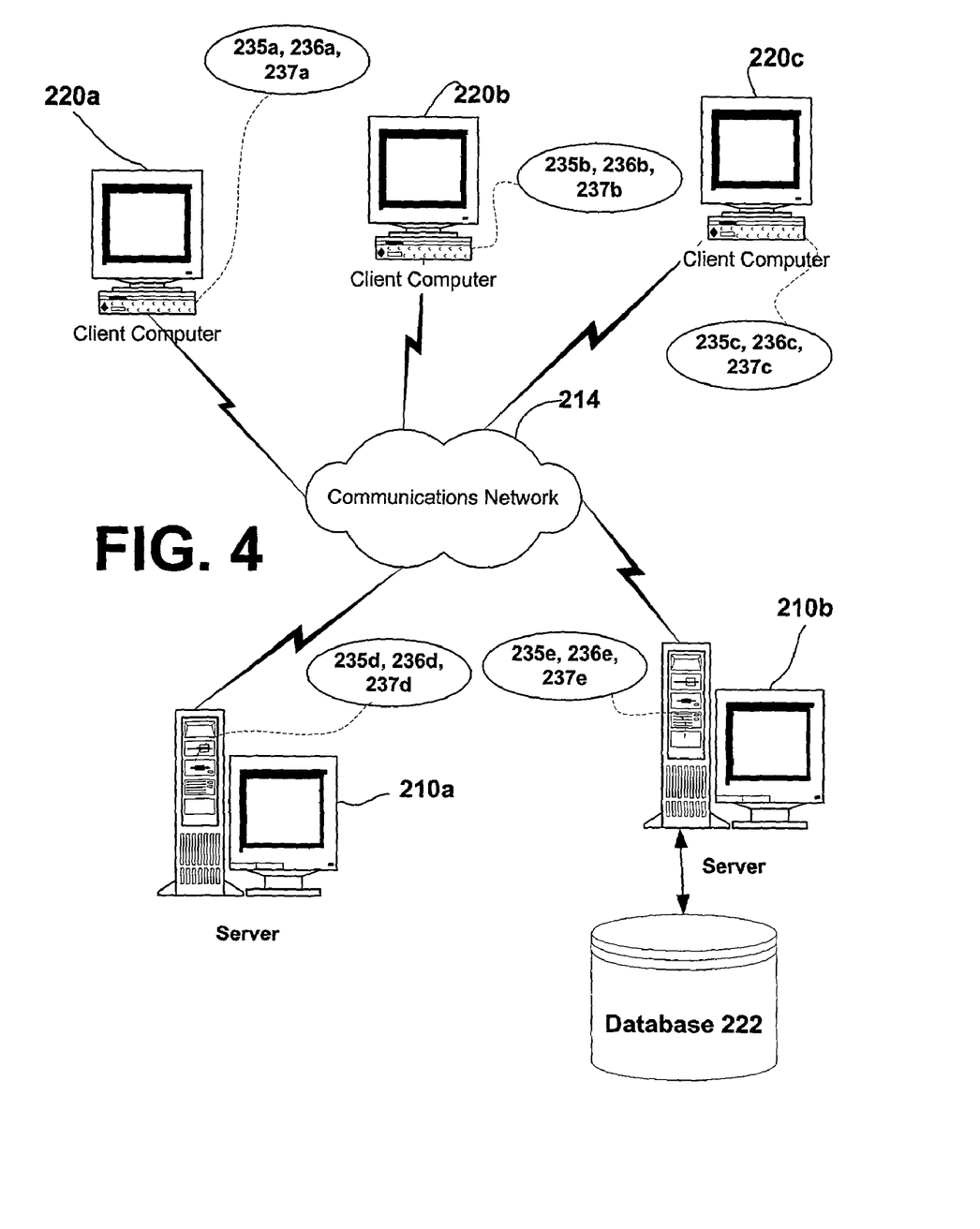
FIG. 4 is a block diagram representing an exemplary network environment in which the present invention may be implemented.

FIG. 4 illustrates an exemplary network environment, with a server in communication with client computers via a network, in which the present invention may be employed. As shown, a number of servers 210a, 210b, etc., are interconnected via a communications network 414 (which may be a LAN, WAN, intranet or the Internet) with a number of client computers 220a, 220b, 220c, etc. In a network environment in which the communications network 214 is the Internet, for example, the servers 210 can be Web servers with which the clients 220a, 220b, etc. communicate via any of a number of known protocols such as hypertext transfer protocol (HTTP). Each client computer 220 and server computer 210 may be equipped with various application program modules 235, other program modules 236 and program data 237, and with connections or access to various types of storage elements or objects, across which files may be stored or to which portion (s) of files may be downloaded or migrated. Any server 210a, 210b, etc. may be responsible for the maintenance and updating of a database 222 in accordance with the present invention. Thus, the present invention can be utilized in a computer network environment having client computers 220a, 220b, etc. for accessing and interacting with a computer network and server computers 210a, 210b, etc. for interacting with client computers 220a, 220b, etc. and databases 222.

System and Method of the Present Invention

According to the Virtual Interface Architecture (VIA), VIA routing protocols recognize only cluster or machine names, and assume only a single server is associated with the cluster or machine represented by the name. In order to support multiple servers, such as in a SAN environment, and in accordance with VIA, a client must be able to resolve a server name associated with each server to a port number on or network address associated with the cluster or machine (hereinafter, "cluster").

Figure 2:
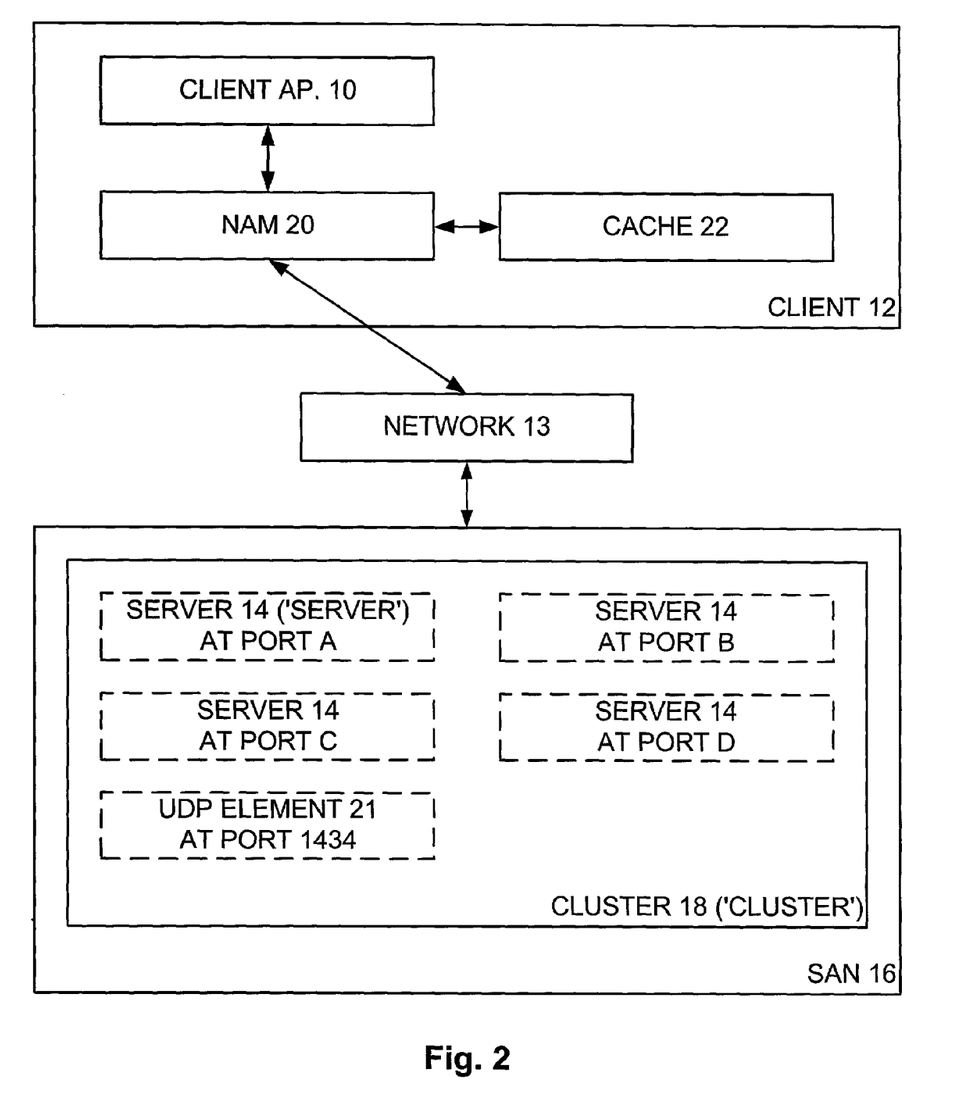
FIG. 2 is a block diagram showing the structure of a system such as that in which the present invention is implemented.

In particular, and referring now to FIG. 2, a client application 10 at a client 12 can connect over a network 13 to any one of multiple instantiated servers 14 on a SAN 16 by knowing (1) the name of the cluster 18 upon which the server 14 resides, and (2) the name of the instance of the server 14 that is to be connected to. In particular, the client application 10 provides such information to a network access module (NAM) 20 on the client 12, and the NAM 20 employs such information to obtain mapping information from the SAN 16 that provides a physical network end-point for the instance of the server 14 on the cluster. Such end-point could be a port number at which the server 14 is listening according to a TCP or VIA protocol, a pipe name for Named Pipes, or the like. The cluster and instance names are dynamically resolved at run-time to the end-point based on a Server Resolution Protocol (SRP) without any prior knowledge of the such endpoint and without any configuration on the client 12.

Figure 3:
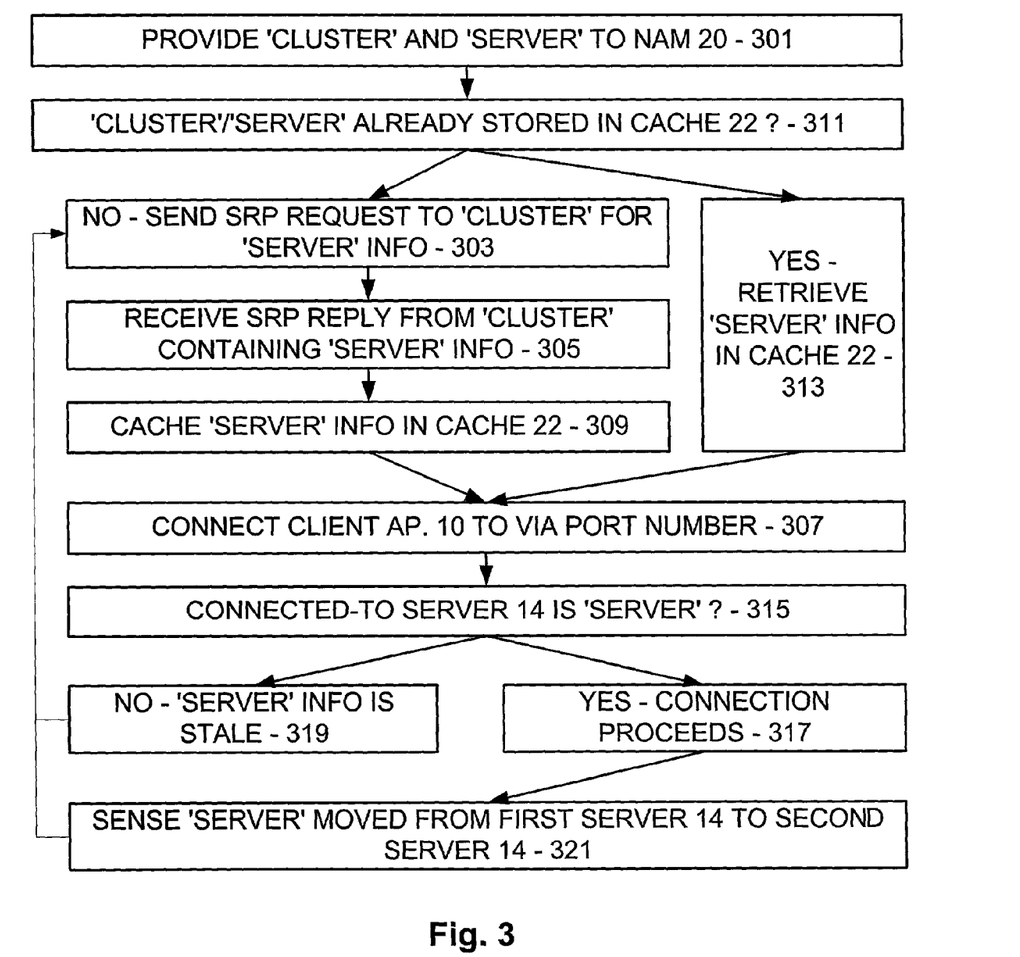
FIG. 3 is a flow diagram showing steps performed in accordance with one embodiment of the present invention where a working server is discovered when a failed server fails.

In connection with the SRP, and referring now to FIG. 3, a client application 10 on a client 12 wishes to connect to a server 12 named 'server' on a cluster 18 named 'cluster', and thus provides 'cluster' and 'server' to the NAM 20 on the client 12 (step 301). Assuming the NAM 20 has not previously resolved 'cluster'/'server' to a port number/network address, the NAM 20 sends an SRP Request message over the network 13 to 'cluster' requesting all port numbers/network addresses on which 'server' is listening (step 303). Preferably, the NAM 20 sends the SRP Request message to 'cluster' as a UDP (user datagram protocol) packet sent to the UDP port of the cluster 18. As is known, the UDP port on most any cluster 18 is typically assigned port number 1434, and thus most any cluster 18 includes a UDP element 21 listening at UDP port 1434 for incoming UDP message packets.

In response to the incoming UDP/SRP Request message to 'cluster', 'cluster' should respond to the NAM 20 over the network 13 with an SRP Reply message containing the requested information, and the NAM 20 receives such requested information (step 305). The SRP Reply message is directed to the client 12 based on information in the received UDP packet. The SRP Reply message in particular includes required connection parameters for connecting to 'server' on 'cluster', and includes the name of the cluster 18 and the port number (i.e., network address) on which the requested server 14 'server' is listening. Note that 'server' may in fact be listening to several port numbers, where each listened-to port number is monitored for packets formatted according to a particular protocol. For example, 'server' may be listening to port number A for VIA protocol packets, and to port number B for TCP protocol packets. Thus, the SRP Reply message may contain a listing of each port number listened to by 'server', and the corresponding protocol expected of the packets to be received at such port number.

Based on the information received in the SRP Reply message, the NAM 20 then connects the client application 10 to the particular port number/network address on which 'server' is listening (step 307). The NAM 20 should employ the port number for 'server' corresponding to the VIA protocol, especially if the client application 10 is sending out VIA packets to SAN 16. However, the NAM 20 could employ the port number for 'server' corresponding to another protocol if another client application 10 is sending out packets according to another protocol.

As should be appreciated, it is inefficient and a waste of resources for the NAM 20 to send an SRP Request and await a response every time a connection is to be opened. To improve performance and increase efficiency, then, the NAM 20 caches the received information in a cache 22 on or convenient to the client 12 (step 309). Accordingly, during each attempt to connect to 'cluster'/'server' or any other server 14, then, the NAM 20 checks the cache 22 to see if received information for 'cluster'/'server' is already present (step 311). If so, the NAM 20 retrieves the information for 'cluster'/'server' from the cache 22 (step 313) and employs same to connect the client application 10 to the particular port number/network address of 'cluster' on which 'server' is listening based on such received information (step 307) without the need to issue an SRP Request.

Once connected, the client 12 and 'server' transact business, and then the connection is closed. Note that the period of connection may be relatively short or relatively long, and the connection may be repeatedly opened and closed or may be left open for a considerable period of time.

In the course of connecting to a particular server 14 using cached information, or perhaps even newly obtained information, the NAM 20 verifies that the connected-to server 14 is in fact the server 14 requested by the client application 10 (step 315). Such verification may occur by way of verifying that the connected-to server 14 is responsive to the name 'server'. If so, the NAM 20 allows the connection to proceed (step 317). If not, the cached information (step 313) is presumed to be stale (step 319), perhaps because the requested server 14 terminated and another server 14 has assumed the requested port number/network address. Accordingly, the NAM 20 at the client 12 performs another SRP Request/Reply exchange (steps 303, 305) with 'cluster', repopulates the cache (step 309) with the updated information, and connects the client application 10 to the server 14 (step 307) based on the updated information.

Note that to repopulate the cache, it may be necessary to first purge the cache of information for 'server'. This is especially true in the case where the NAM 20 defaults to the cache information if present.

As was discussed above, when 'server' is a first server 14 on a network such as a SAN 16 and the first server 14 fails, the functionality of the first server 14 may be automatically switched at the SAN 16 to a second server 14, with the result being that 'server' is now the second server 14. However, when interconnected through a SAN 16, the operating system thereat does not provide any fail-over support that would re-map or re-direct a request from the client 12 to 'server' from the failed first server 14 to the working second server 14, especially in the middle of a connection between the client 12 and the first server 14. Moreover, the client 12 and the NAM 20 thereon would not inherently know that 'server' has been moved to the second server 14, let alone the identity of the second server 14.

Accordingly, in the situation where the first server 14 fails and is replaced by the second server 14 such that 'server' is now the second server 14, the connection between the first server 14 and the client 12 based on the port number/network address of the first server 14 is interrupted, and the NAM 20 is made aware of such interruption, typically by sensing a lack of response to packets sent to the first server 14 (step 321). The NAM 20 may first try to reconnect to 'server' at the first server 14 using the connection information for 'server' at the first server 14 in the cache (i.e., a first port number). Of course, the reconnect attempt will fail since 'server' now resides on the second server 14 in the cluster 18 (i.e., at a second port number different from the first port number).

Accordingly, the NAM 20 realizes that 'server' may have moved to the second server 14 and that it must determine connection information for 'server' at the second server 14

(i.e., the second port number). In particular, and in response to the interruption, the NAM 20 at the client 12 performs another SRP exchange (steps 303, 305) with 'cluster', repopulates the cache (step 309) with updated information including a new port number/network address for 'server', and connects the client application 10 to the second server 14 as 'server' (step 307) based on the updated information (i.e., the second port number).

Note that the NAM 20 may also employ the SRP to enumerate all available servers 14 on a cluster 18 and retrieve information about each of same. Such an SRP Enumerate message would evoke an SRP Reply message containing information about all instances on that cluster 18. Similarly, the NAM 20 may employ the SRP to enumerate all available servers 14 on the SAN 16 and retrieve information about each of same. Such an SRP Enumerate message would evoke an SRP Reply message containing information about all instances on the SAN 16.

Recognizing that there are likely multiple servers 14 running on a cluster 18, only one of such servers 14 should respond to SRP messages from the NAM 20 at a particular time. Such active SRP server 14 could be the first server 14 started on the cluster 18, for example. Each server 14 started thereafter on the cluster 18 would detect that an active SRP server 14 is running and would deem itself as being passive. In addition, each server 14 started thereafter on the cluster 18 would send an SRP Join message to the active SRP server 14, and such active SRP server 14 would build a list of passive servers 14 on the cluster 18. When a passive server 14 is shut down, such server 14 sends an SRP Leave message to the active SRP server 14 and such active SRP server 14 thus removes such shutting-down passive server 14 from the passive server list.

Accordingly, if and when the active SRP server 14 terminates gracefully, another server 14 on the cluster 18 can take over as the active SRP server 14. To do so, the current active SRP server 14 before shutting down would send an SRP Activate message to the first server 14 on the passive server list, and such first server 14 on the list becomes the new active SRP server 14. The SRP Activate message would also include the passive server list.

Of course, such a procedure is not available where the active SRP server 14 terminates catastrophically and without sending the SRP Activate message. For such case, a keep-alive mechanism is employed wherein every passive server 14 periodically sends an SRP KeepAlive message to the active SRP server 14. If the active SRP server 14 fails to send a KeepAlive reply in a timely manner, the querying passive server 14 presumes that the active SRP server 14 has terminated catastrophically, and thus takes over as the new active SRP server 14.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful NAM 20 at a client 12 of a SAN 16 or the like that acts as a fail-over mechanism implemented according to VIA to allow the client 12 to discover 'server' at a working server 14 when a failed server 14 previously having 'server' fails. The fail-over mechanism is a connection and reconnection process employed by the NAM 20 that is transparent to client application 10, the client 12, and the user. The process is completely implemented in software and requires no extra support from the operating system of the SAN 16. The client application 10, the client 12, and the user are all unaware of the fail-over of 'server', since such fail-over is dynamically detected and addressed with little if any latency. The addressing of the fail-over occurs during run-time, resulting in increased reliability and up-time, and requires no manual pre-configuration or setup. With SRP, clients get the increased bandwidth and performance of the VIA protocol and the SAN 16 as well as the functionality and availability of multiple clustered servers 14.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. In a distributed computing system comprising a server cluster and a client computer, wherein the server cluster includes a first server and a second server, and wherein the client computer includes a client application, a cache, and a client-side network access module (NAM) by which the client application communicates with the server cluster, a method for providing seamless fail-over connectivity between the client computer and the server cluster, the method comprising:

receiving, at the client-side NAM, a request from the client application comprising a server name and a cluster name of the server cluster;

sending, by the client-side NAM, a first Server Resolution Protocol request in user datagram protocol (UDP) to the server cluster requesting first connection information for a server associated with the server name;

receiving, at the client-side NAM, a first Server Resolution Protocol reply comprising the connection information of the first server, wherein the connection information of the first server comprises a port number for a Virtual Interface Architecture (VIA) port of the first server;

establishing, by the client-side NAM, a first connection between the client application and the VIA port of the first server in the server cluster using a VIA protocol;

providing, by the client-side NAM, seamless fail-over connectivity from the first server to the second sever in the server cluster in a manner transparent to the client application, when the server cluster automatically switches operation from the first server to the second server, wherein providing seamless fail-over connectivity by the client-side NAM comprises:

detecting, by the client-side NAM, a failure of the first connection between the first server in the server cluster and the client application, when the server cluster automatically switches operation from the first server to the second server;

sending, by the client-side NAM, a second Server Resolution Protocol request in UDP to the server cluster requesting connection information for a new working server in the server cluster associated with the server name and the cluster name of the server cluster;

receiving, by the client-side NAM, a second Server Resolution Protocol reply from the server cluster comprising connection information of the second server as the new working server, wherein the connection information of the second server comprises a port number for a VIA port of the second server;

caching, by the client-side NAM, the second Server Resolution Protocol reply in the cache of the client computer such that the cache contains a mapping between the connection information of the second server and the cluster name and the server name; and establishing, by the client-side NAM, a second connection between the client application and the VIA port of the second server using the VIA protocol based on the connection information of the second server, wherein the server cluster does not provide fail-over support to re-direct a request from the client application from the first server to the second server when the server cluster automatically switches operation from the first server to the second server.

2. The method of claim 1, wherein the establishing the second connection comprises retrieving a network address from the connection information of the second server from the cache.

3. The method of claim 2, further comprising verifying that the second server maps to the server name.

4. The method of claim 3, wherein verifying that the second server maps to the server name comprises verifying that the second server is responsive to the server name.

5. The method of claim 1, further comprising purging the cache prior to caching the second Server Resolution Protocol reply.

6. The method of claim 1, wherein the the connection information provided in the first Server Resolution Protocol response comprises a plurality of port numbers, wherein each port number corresponds to a different communications protocol.

7. The method of claim 1, wherein the first server and second server store and retrieve relational data by way of Structured Query Language (SQL) commands.

8. The method of claim 1, wherein the first server is designated as active and the second server is designated as passive.

9. The method of claim 8, wherein the second server periodically sends a keep-alive message to the first server.

10. The method of claim 9, wherein the second server assumes designation as active when the first server fails to respond to the keep-alive message.

11. The method of claim 1, wherein the connection information provided in the second Server Resolution Protocol response comprises a plurality of port numbers, wherein each port number corresponds to a different communications protocol.

12. The method of claim 1, wherein the first connection and the second connection comprise VIA formatted packets.

13. A computer readable storage medium comprising a tangible physical hardware structure having computer executable instructions that are executable by a computer to perform a method for providing seamless fail-over connectivity in a distributed system comprising a client computer and a server cluster, wherein the server cluster includes a first server and a second server, and wherein the client computer includes a client application, a cache, and a client-side network access module (NAM) by which the client application communicates with the server cluster, the method comprising:

receiving, at the client-side NAM, a request from the client application comprising a server name and a cluster name of the server cluster;

sending, by the client-side NAM, a first Server Resolution Protocol request in user datagram protocol (UDP) to the server cluster requesting first connection information for a server associated with the server name;

receiving, at the client-side NAM, a first Server Resolution Protocol reply comprising connection information of the first server, wherein the connection information of the first server comprises a port number for a Virtual Interface Architecture (VIA) port of the first server;

establishing, by the client-side NAM, a first connection between the client application and the VIA port of the first server in the server cluster using a VIA protocol;

providing, by the client-side NAM, seamless fail-over connectivity from the first server to the second sever in the server cluster in a manner transparent to the client application, when the server cluster automatically switches operation from the first server to the second server, wherein providing seamless fail-over connectivity by the client-side NAM comprises:

detecting, by the client-side NAM, a failure of the first connection between the first server in the server cluster and the client application, when the server cluster automatically switches operation from the first server to the second server;

sending, by the client-side NAM, a second Server Resolution Protocol request in UDP to the server cluster requesting connection information for a new working server in the server cluster associated with the server name and the cluster name of the server cluster;

receiving, by the client-side NAM, a second Server Resolution Protocol reply from the server cluster comprising connection information of the second server as the new working server, wherein the connection information of the second server comprises a port number for a VIA port of the second server;

caching, by the client-side NAM, the second Server Resolution Protocol reply in the cache of the client computer such that the cache contains a mapping between the connection information of the second server and the cluster name and the server name; and establishing, by the client-side NAM, a second connection between the client application and the VIA port of the second server using the VIA protocol based on the connection information of the second server, wherein the server cluster does not provide fail-over support to re-direct a request from the client application from the first server to the second server when the server cluster automatically switches operation from the first server to the second server.

14. The computer readable storage medium of claim 13, wherein the first connection and the second connection comprise VIA formatted packets.

15. A system for providing seamless fail-over of client connectivity with a server cluster, the system comprising:

a client application;

a client-side network access module (NAM) by which the client application communicates with the server cluster; and a cache, wherein the client-side network access module:

receives a request from the client application comprising a server name and a cluster name of the server cluster, sends a first Server Resolution Protocol request in user datagram protocol (UDP) to the server cluster requesting connection information for a server associated with the server name, receives a first Server Resolution Protocol reply comprising connection information of a first server, wherein the connection information of the first server comprises a port number for a Virtual Interface Architecture (VIA) port of the first server, establishes a first VIA protocol connection between the client application and the VIA port of the first server in the server cluster using a VIA protocol, detects a failure of the first Virtual Interface Architecture (VIA) protocol connection between the client application and the first server in the server cluster, sends a second Server Resolution Protocol request in UDP to the server cluster requesting connection information for a server associated with the server name and the cluster name of the server cluster, receives a second Server Resolution Protocol reply from the server cluster comprising connection information of a second server, wherein the connection information of the second server comprises a port number for a VIA port of the second server, caches the second Server Resolution Protocol reply in the cache such that the cache contains a mapping between the connection information of the second server and the cluster name and the server name, and establishes a second VIA protocol connection between the client application and the second server using the connection information of the second server, wherein the server cluster does not provide fail-over support to re-direct a request from the client application from the first server to the second server when the server cluster automatically switches operation from the first server to the second server; and wherein the detecting, the sending, the receiving, caching, and the establishing are performed by the client-side NAM to provide seamless fail-over connectivity of the client application from the first server to the second sever in a manner transparent to the client application, when the server cluster automatically switches operation from the first server to the second server.

16. The system of claim 15, wherein the first connection and the second connection comprise VIA formatted packets.

* * * * *